April 18, 1961 N. E. WHITNEY, JR 2,980,785
ELECTRIC HEATING
Filed March 30, 1959 3 Sheets-Sheet 1

Inventor
Nicholas E. Whitney, Jr.
By Mann, Brown and McWilliams
Attys.

Inventor
Nicholas E. Whitney, Jr.
By Mann, Brown & McWilliams
Attys

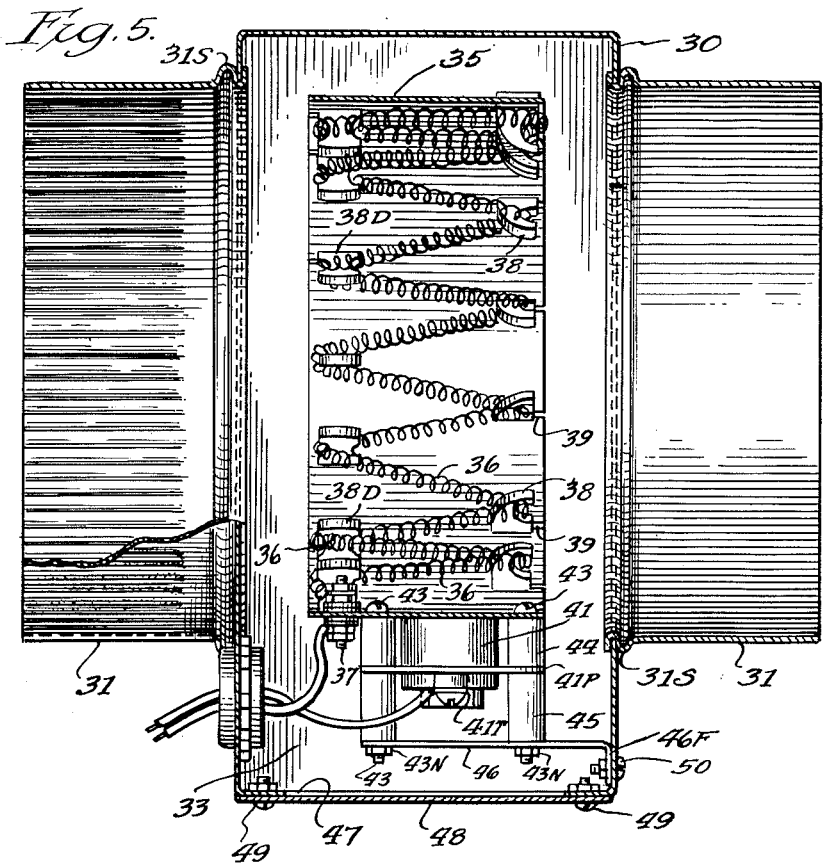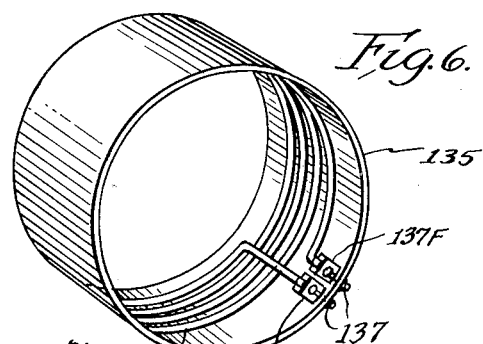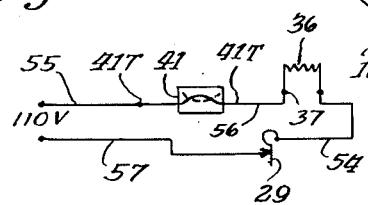

United States Patent Office 2,980,785
Patented Apr. 18, 1961

2,980,785

ELECTRIC HEATING

Nicholas E. Whitney, Jr., Michigan City, Ind., assignor to Nicholas E. Whitney, Sr., Michigan City, Ind.

Filed Mar. 30, 1959, Ser. No. 803,015

4 Claims. (Cl. 219—34)

This invention relates to the heating of buildings, and particularly to the heating of such buildings through the use of electrical power.

It is quite common practice to provide multiple-room buildings with air circulating and filtering systems which in many instances are associated with or form parts of a hot air heating system or an air-conditioning or cooling system, and it is the primary object of this invention to enable central air heating systems of any of the foregoing kinds to be utilized in providing individually controlled electrically-powered heating means for the several rooms of the buildings. In buildings where the system is intended primarily for circulating and filtering the air supply, the present invention contemplates the provision of electrical heating means for the several rooms whereby the air supplied to each of the rooms may be heated electrically under control of individual thermostatic control means in the related rooms. In those instances where cooling or air-conditioning installations are provided with central cooling and air circulating means, the invention contemplates the heating of the air as it passes through the individual room supply passages or ducts, coupled with thermostatic control of the heating means in accordance with the room temperature. Finally, the present invention contemplates that where a central hot air heating plant is utilized, the air supplied through the room ducts to the individual rooms would be electrically heated under control of the individual room thermostat so that the electrical heating means will in most instances constitute a booster heating source to increase the overall capacity of the hot air heating system.

Another important object of the present invention is to provide an electrical heating unit adapted to be included in the individual room ducts of a central air circulating system, and a related object is to provide such a unit that may be readily adapted to the heating requirements of the room with which it is associated.

More specifically, it is an object of the present invention to provide such a heating unit for installation in the individual room ducts where the heating unit attains its heating action without introducing any appreciable restriction in the duct in which it is installed.

Another object of this invention is to provide an electrical heating unit for installation in individual room ducts of a central air circulating system wherein the unit provides a radiation shield that minimizes heat transfer by radiation to the outer surface of the unit and wherein the radiation shield also serves as a readily removable and replaceable support for the electrical resistance heating portions of the device. Another object is to provide such a unit that has an extending portion at one side thereof which serves as a junction box for facilitating the electrical wiring of the unit.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 5 is a vertical sectional view taken substantially along the line 5—5 of Fig. 4;

Fig. 6 is a view showing the radiation shield equipped with an electrical heating element of the insulated or sheathed type; and Fig. 7 is a schematic wiring diagram showing the connections of one of the heating units.

Figure 1:
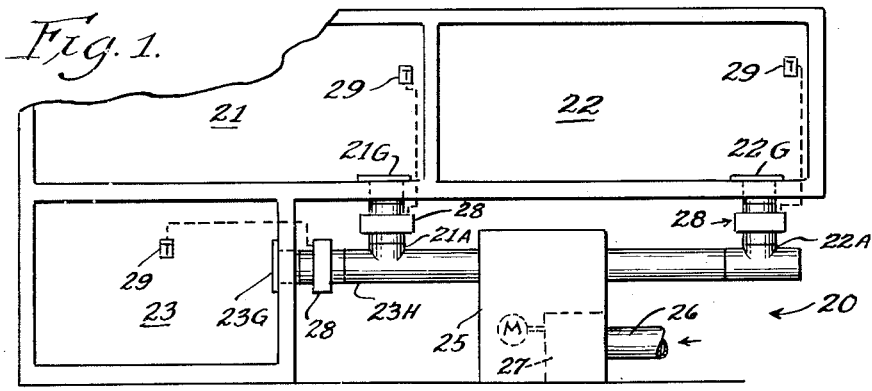
Fig. 1 is a schematic view of a building heating system embodying electrical heating means according to the present invention.
Figure 2:
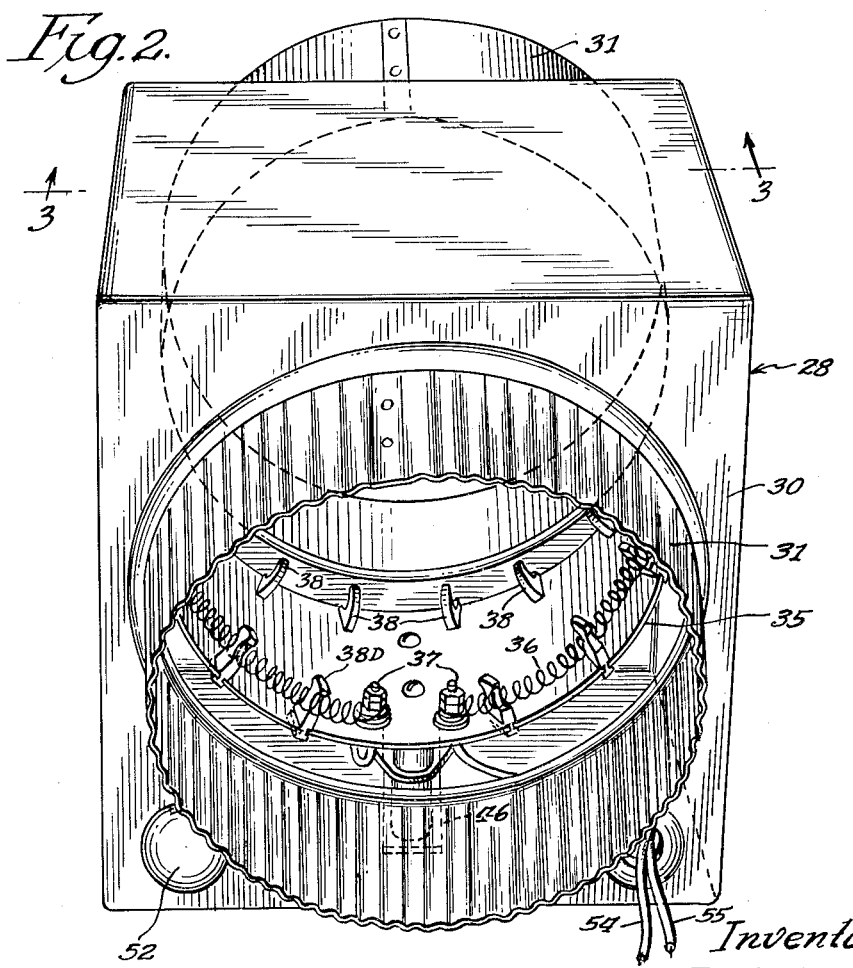
Fig. 2 is a perspective view of an individual heating unit embodying the invention.

For purposes of disclosure the invention is herein illustrated as embodied in a central air circulating installation 20 that is associated with a building that is diagrammatically illustrated as including rooms 21, 22 and 23. The central air circulating installation 20 may of course form part of a heating or cooling system of conventional form and comprises a main cabinet 25 having an air inlet 26 and a motor driven blower 27 that is disposed within the cabinet to force air from the inlet 26 through a plurality of ducts to individual room ducts 21A, 22A and 23A so that the air may be circulated into the individual rooms. No effort has been made in Fig. 1 to illustrate the return duct system. Under the present invention each of the room ducts 21A, 22A and 23A includes an electric heating unit 28 through which the air passes to the usual air discharge deflectors or grills 21G, 22G and 23G. It may be noted that these ducts may discharge through any of the walls of the rooms with which they are to be associated, and in each room a thermostat 29 is provided for controlling its associated electric heater 28 in accordance with the sensed room temperature.

In Figs. 2 to 5 of the drawings the specific structure of the electrical heating unit 28 is illustrated while in Fig. 7, a schematic wiring diagram shows the manner of connection and control of the heating units 28. Each unit 28 comprises a sheet metal housing 30 that is rectangular or box-like in form, and at opposite sides thereof the housing 30 has connecting stubs 31 of a form and size for connection with a particular form and size of duct. These connecting stubs 31 may serve as inlet and outlet connections and are made from sheet metal and are fixed in aligned relationship in appropriate openings in the opposite walls of the housing 30. Such connection is herein shown as being obtained by means of a rolled seam 31S.

Figure 3:
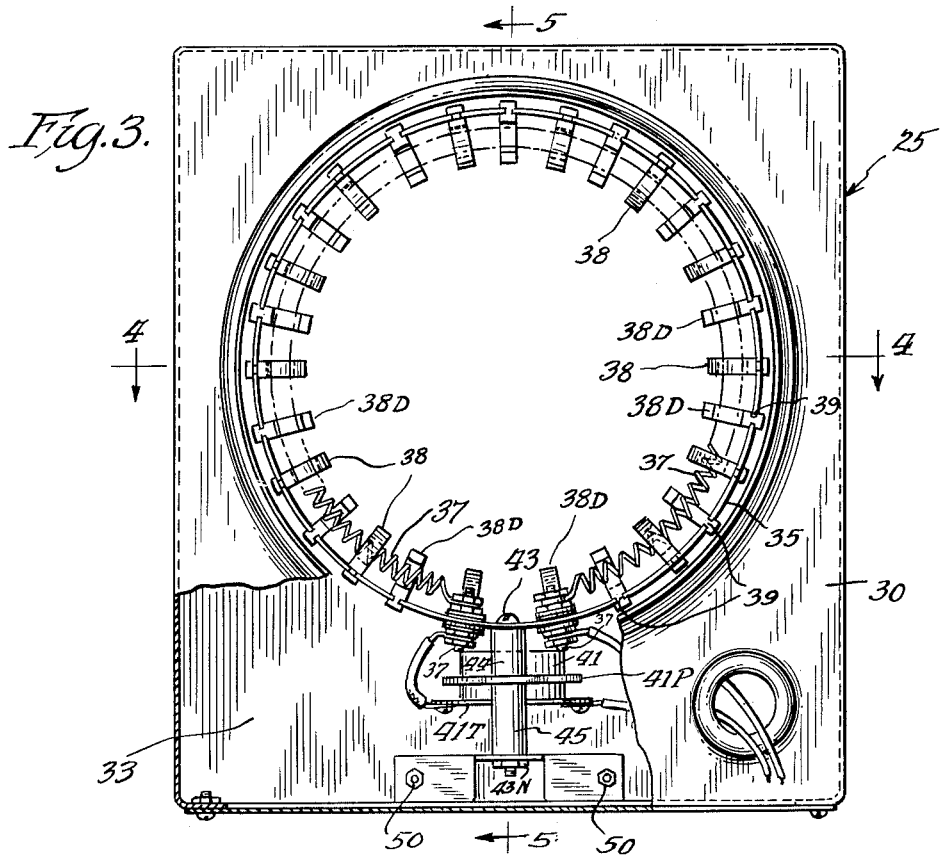
Fig. 3 is a vertical sectional view of the heating unit, the section being taken substantially along the line 3—3 of Fig. 2.
Figure 4:
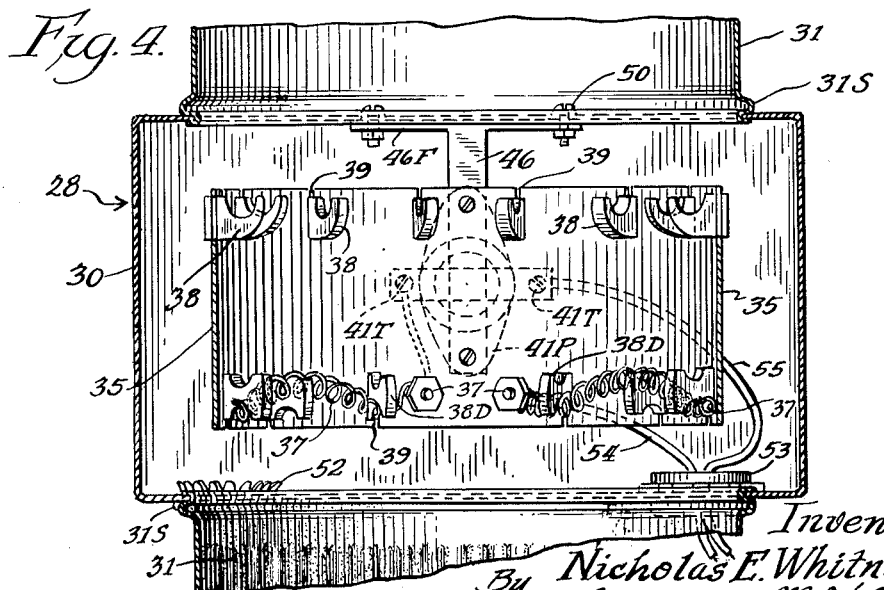
Fig. 4 is a horizontal sectional view taken substantially along the line 4—4 of Fig. 3.

As will be evident, particularly in Figs. 3 and 5, the connecting stubs 31 are located in what might be termed an eccentric relationship with respect to the center of the housing 30, and this relationship provides a substantial space 33 within the housing and at one side of the path of air movement through the housing so that this space 33 may serve in effect as a junction box which facilitates the making of the necessary electrical connections, and which also serves as a space whereas mounting and supporting means may be provided for the internal parts of the unit 28.

Within the housing 30, air heating and directing means are provided, and in the present instance, such means comprise a tubular radiation shield 35 which is of a diameter somewhat smaller than the diameter of the connecting stubs 31, and the radiation shield has a length, as will be evident in Fig. 5, that is considerably less than the distance between the adjacent inner ends of the connecting stubs 31. The radiation shield 35 is supported within the housing 30, as will be explained hereinafter, in aligned relationship with respect to the stubs 31, and electrical heating means are mounted on and within the radiation shield 35 so that air passing through the housing will pass through the radiation shield and will be heated by such electrical heating means. In the form of the invention shown in Figs. 2 to 5, such electrical heating means are provided by a continuous coiled resistance heating element 36 which is supported in spaced and insulated relationship with respect to the radiation shield and is extended between a pair of terminals 37. To support the resistance element 36, a plurality of electrical insulators 38 and 38D are mounted about the respective edges of the radiation shield 35 so as to project inwardly therefrom. The insulators 38D are of such a form as to have notches or grooves faced in opposite directions for purposes that will hereinafter appear, while the insulators 38 have grooves facing endwise away from the center plane of the radiation shield. The particular way in which the insulators 38 and 38D are supported in the radiation shield 35 is a matter of choice, but in the present instance such support is attained through providing a plurality of slots 39 extending into the edges of the shield 35 so that the insulators may be inserted endwise into these slots and may be fixed in position therein. With this arrangement of insulators 38 and 38D, the resistance heating element 36 may extend back and forth between alternate insulators 38D to provide a relatively low heating capacity in the unit, or may be extended back and forth around the alternate insulators 38 and 38D as shown in Fig. 5 so as to provide a heater of a higher capacity.

The unit 28 is provided with thermostatic safety cutout means in the energizing circuit of the heating element 36, and in the present instance, this means is provided by a thermostatic switch unit 41 which may be of any commercial type such as those that embody a thermostatic disk. The unit 41 as herein shown has an elongated or slightly oval mounting plate 41P and has oppositely extending terminals 41T, and the unit 41 is mounted in association with the radiation shield 35 so that the control unit 41 and the shield 35, with its heating element 26, may be put into position within the housing 30 as a unit.

Thus, the thermostatic unit 41 is placed with one face thereof in engagement with the outer face of the radiation shield 35, and the relationship is such that the unit 41 is located quite close to the location of the terminals 37. In this position the mounting plate 41P and the terminals 41T are spaced a considerable distance from the radiation shield 35, and a pair of mounting bolts 43 are extended outwardly through the radiation shield 35 and through the openings in the mounting plate 41P. Similar spacer sleeves 45 are put in position on the opposite side of the mounting plate 41P and about the bolts 43 so that a mounting bracket 46 may be put in position against the ends of the sleeves 45 and may be held in position by nuts 43N. Thus the bracket 46, the thermostatic control unit 41, and the radiation shield 35 constitute a unit which may be inserted into the housing 30, and to facilitate such insertion, the edge wall of the housing 30 that defines one side of the junction-box space 33 is cut away to provide an access opening 47 which may be closed by a wall 48 held in place by screws 49. Thus the assembly may be inserted through the opening 47 and the bracket may be secured in position by means of bolts 50. To facilitate such mounting of the bracket 46, the bracket has an angularly related mounting flange 46F that is clamped against one of the walls of the housing 30 by the bolts 50.

The units 28 are mounted in the respective room ducts so that the removable plate 48 and its related junction box area are exposed in a readily accessible positions so that the units 28 may, if desired, be mounted by the sheet metal workers who are installing the ducts, and may thereafter be fitted with internal heating units of the desired capacity by inserting the units into position through the access opening 47. When this is done the related electrical connections may readily be made in the junction box space 33. Thus the junction box has one or more openings formed therein through which the electrical connections may be made, and in Figs. 2 and 4 of the drawings one of these openings is shown as being capped at 52 by a removable cap. In the other one of the two openings that have been shown, an insulating ferrule 53 has been shown so that wires 54 and 55 may be extended therethrough from a suitable source. The wire 55 is connected to one of the terminals 41T of the safety cut out switch 41, while the other terminal 41 is connected by a wire 56 to one of the terminals 37, the wire 54 being connected to the other one of these terminals. Thus the wire 54 may be extended to one of the terminals of the related thermostat 39, the other terminal of which is connected by a wire 57 to the other side of the line voltage source. Thus, the heater when so connected, controls the heating element 36 to maintain its desired room temperature as determined by the room thermostat 29, while overheating of the unit is prevented by the safety cut out 41.

In Fig. 6 of the drawings an alternative embodiment of the internal heating means is disclosed and in this embodiment a similar radiation shield 135 is utilized. The radiation shield 135 has terminals 137 which serve to support an internal heating element 136 that is made up in the form of a coil disposed within and relatively close to the internal surface of the rod shield 135, this heating element 136 being made from a sheathed heating element of conventional form supported in position by mounting fittings 137F associated with opposite ends of the coil.

With the electrical heating unit 28 that has been described, or the unit that includes the insulated or sheathed heating element as shown in Fig. 6, the apparatus of the present invention may be readily installed to take care of a wide variety of heating requirements, whether the heating unit of this invention is to be used as the sole room heating source, or as a booster heater in connection with the ducts of a hot air heating furnace. In either event, the output or wattage of the heating element is selected in accordance with the indicated heat demand, and the operation of the heating element is controlled to maintain the desired temperature of the air discharged in the related room that is being heated. Different output air temperatures may be selected, and as an example, it may be determined that it is desirable to discharge the air from the heater at a temperature of 140° F., in which event the safety control switch 41 is set for a slightly higher temperature on the order of 150° F. Thus, the safety control switch 41 will function to prevent unduly high temperatures of the housing or of the discharged air.

As in all heating systems, the air movement or discharge rate must be sufficiently high to dissipate the heat produced by the heating element without causing the air to be heated to an unduly high temperature, and as an example, where a particular heater is to provide approximately 3400 B.t.u. per hour, the heating element would be approximately a 1000 watt element and with a throughput of 50 cubic feet of air per minute, the temperatures of the discharged air would be substantially 140°. As this air is discharged into the room, it may be distributed or directed by any of the conventional forms of distributing registers of diffusers. Under the present invention, of course, the airflow through the duct system may be obtained from any of the conventional central air circulating systems, and as used herein, the phrase "air circulating system or apparatus" is intended to designate such systems whether they are used alone or as a part of central heating or air conditioning installations.

From the foregoing description it will be apparent that the present invention provides a simple and effective system for electrically heating a plurality of rooms under individual control, and it will also be apparent that the invention provides an electrical heating unit that has a wide range of usefulness for installation in and as a part of the individual room ducts of a central air circulating system so that the individual rooms may be heated under individual temperature control.

It will also be evident that the heating units of the present invention are of such a character that the heating output and control of the units may be readily and easily varied to meet varying conditions that are encountered. Furthermore, the present invention provides an electrical heating unit where the heating element is supported in a novel manner which minimizes heat transfer by radiation and which enables the heating and control elements of the unit to be readily installed or removed.

Thus, while preferred embodiments of the invention have been illustrated herein, it is to be understood that changes and variations may be made by those skilled in the art without departing from the spirit and scope of the appending claims.

I claim:

1. An electric heating unit comprising a housing having oppositely extending aligned connecting stubs for connecting the housing in an air supply duct, a radiation shield of tubular form disposed within the housing in spaced relation to the walls of the housing and in co-axial relation to said stubs, said shield defining a main passage through which a major portion of an air supply may flow, and said shield and the walls of the housing defining a secondary air path about the shield and through which air may flow between such walls and the shield as the air moves through the housing, an electrical resistance heating element supported on and within said shield, and a temperature responsive electric cut-out device included in circuit with said resistance element and disposed and physically connected between said radiation shield and one of the walls of the housing as the sole physical support for said shield in said housing.

2. An electric heating unit for connection in a room supply duct of a central air circulating system, said unit comprising walls defining a housing, aligned inlet and outlet openings in opposite sides of the housing, a tubular radiation shield supported within said housing in spaced relation with respect to the walls of the housing and in coaxial relation to said inlet and outlet openings, a resistance heating element supported on and within said radiation shield, one of said walls being spaced from the radiation shield to provide junction-box space, a temperature responsive limit switch disposed in said space, means including said switch supporting said shield in position in the housing, and means removably securing said one wall in position on said housing to facilitate insertion or removal of said shield and heating element.

3. An electric heating unit for connection in a room supply duct of a central air circulating system, said unit comprising walls defining a housing, aligned inlet and outlet openings in opposite sides of the housing, a tubular radiation shield supported within said housing in spaced relation with respect to the walls of the housing and in coaxial relation to said inlet and outlet openings, a resistance heating element supported on and within said radiation shield, one of said walls being spaced from the radiation shield to provide junction-box space, a temperature responsive limit switch disposed in said space, a bracket on which said switch and said shield are mounted, means for securing said bracket to a wall of said housing to support the shield and said switch in the housing, and means removably securing said one wall in position on said housing to facilitate insertion or removal of said shield and heating element.

4. An electric heating unit for connection in a room supply duct of a central air circulating system, said unit comprising walls defining a housing, aligned inlet and outlet openings in opposite sides of the housing, a tubular radiation shield supported within said housing in spaced relation with respect to the walls of the housing and in coaxial relation to said inlet and outlet openings, a resistance heating element supported on and within said radiation shield, one of said walls being spaced from the radiation shield to provide junction-box space, a bracket removably supporting said shield in position in the housing, and means removably securing said one wall in position on said housing to facilitate insertion or removal of said shield.

References Cited in the file of this patent

UNITED STATES PATENTS

| | | |
|---|---|---|
| 1,560,377 | Daley | Nov. 3, 1925 |
| 2,022,453 | Ball | Nov. 26, 1935 |
| 2,438,670 | MacDonald et al. | Mar. 30, 1948 |
| 2,568,278 | Favot | Sept. 18, 1951 |
| 2,660,407 | Lehane | Nov. 24, 1953 |
| 2,683,796 | Koff | July 13, 1954 |
| 2,712,053 | Gallay | June 28, 1955 |
| 2,712,588 | Epstein | July 5, 1955 |
| 2,819,375 | Mohn et al. | Jan. 7, 1958 |
| 2,839,659 | Cotts et al. | June 17, 1958 |